United States Patent
Itagaki et al.

(10) Patent No.: US 11,956,562 B2
(45) Date of Patent: Apr. 9, 2024

(54) IMAGE PROCESSING DEVICE, IMAGE PROCESSING METHODS AND PROGRAMS, AND IMAGING APPARATUS

(71) Applicant: FUJIFILM Corporation, Tokyo (JP)

(72) Inventors: Kazuyuki Itagaki, Kanagawa (JP); Takatoshi Karino, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 93 days.

(21) Appl. No.: 17/479,501

(22) Filed: Sep. 20, 2021

(65) Prior Publication Data
US 2022/0030181 A1  Jan. 27, 2022

Related U.S. Application Data

(63) Continuation of application No. PCT/JP2020/012668, filed on Mar. 23, 2020.

(30) Foreign Application Priority Data

Mar. 25, 2019  (JP) .................................. 2019-056587

(51) Int. Cl.
*H04N 5/278*  (2006.01)
*G06T 11/60*  (2006.01)
(Continued)

(52) U.S. Cl.
CPC ............. *H04N 5/278* (2013.01); *G06T 11/60* (2013.01); *G06V 20/20* (2022.01); *H04N 23/63* (2023.01); *H04N 23/64* (2023.01)

(58) Field of Classification Search
CPC ........ H04N 5/278; H04N 23/63; H04N 23/64; G06V 20/20
(Continued)

(56) References Cited

U.S. PATENT DOCUMENTS 10,469,916 B1 *  11/2019  Teller ................... H04N 21/812
2009/0087099 A1   4/2009  Nakamura
(Continued)

FOREIGN PATENT DOCUMENTS

JP  2007-266793 A  10/2007
JP  2009-089077 A  4/2009
(Continued)

OTHER PUBLICATIONS

International Search Report issued in PCT/JP2020/012668; dated Jun. 16, 2020.
(Continued)

*Primary Examiner* — Joel W Fosselman
(74) *Attorney, Agent, or Firm* — Studebaker & Brackett PC

(57) ABSTRACT

Provided are an image processing device, an image processing method and program, and an imaging apparatus capable of assisting in capturing an image in which a character or a character string is laid out at the appropriate position. In order to achieve the above-mentioned object, the image processing device includes a layout determination unit that determines a layout of the character or the character string in an image of the target image in accordance with meaning of the character or the character string; an assist information generation unit that generates imaging assist information for assisting in setting composition during imaging performed by the imaging unit; a synthesis unit that synthesizes the imaging assist information with the target image based on the determined layout; and a display control unit that displays the synthesized image on a display unit.

17 Claims, 10 Drawing Sheets

* "侍" READS "SAMURAI" IN JAPANESE.

(51) Int. Cl.
     *G06V 20/20*         (2022.01)
     *H04N 23/60*       (2023.01)
     *H04N 23/63*       (2023.01)

(58) Field of Classification Search
     USPC .......................................................... 348/239
     See application file for complete search history.

(56) References Cited

U.S. PATENT DOCUMENTS

| | | | | |
|---|---|---|---|---|
| 2011/0273474 A1* | 11/2011 | Iwayama | ............. | H04N 23/611 |
| | | | | 345/636 |
| 2021/0407150 A1* | 12/2021 | Czymontek | ............ | G06Q 50/30 |

FOREIGN PATENT DOCUMENTS

| | | |
|---|---|---|
| JP | 2010-103651 A | 5/2010 |
| JP | 2014-165666 A | 9/2014 |

OTHER PUBLICATIONS

International Preliminary Report On Patentability and Written Opinion issued in PCT/JP2020/012668; dated Sep. 28, 2021.

\* cited by examiner

FIG. 8
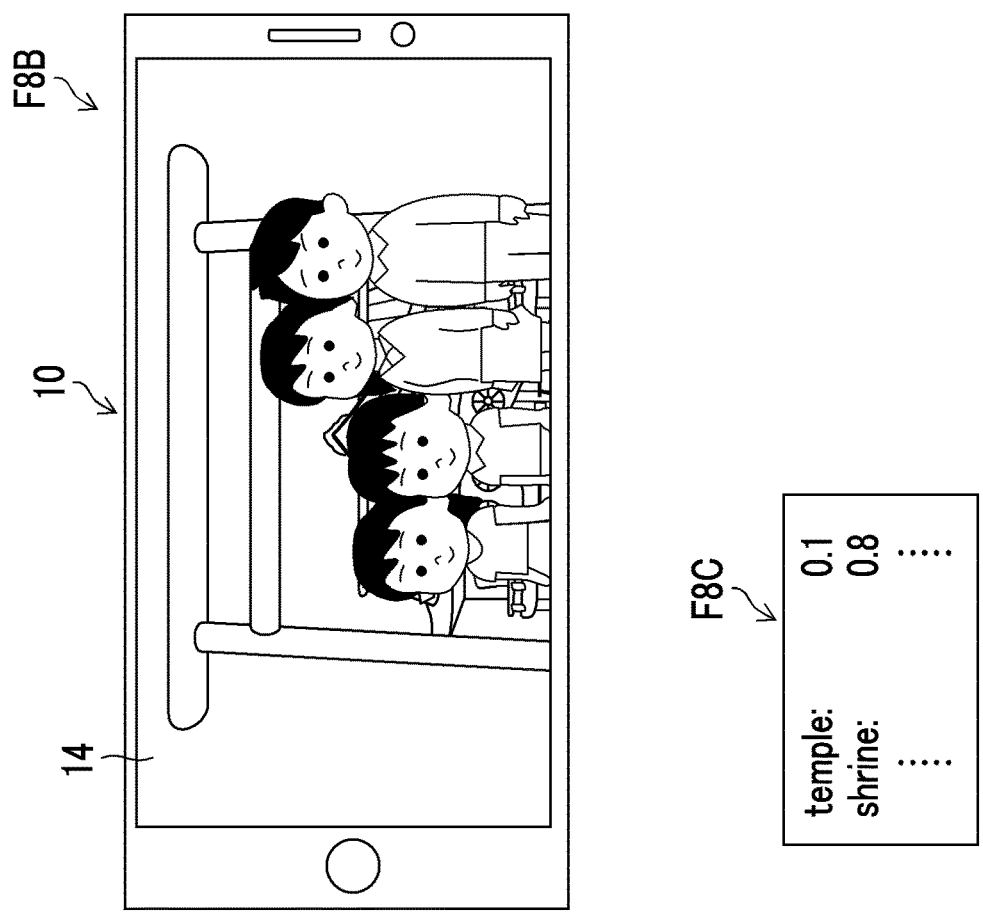
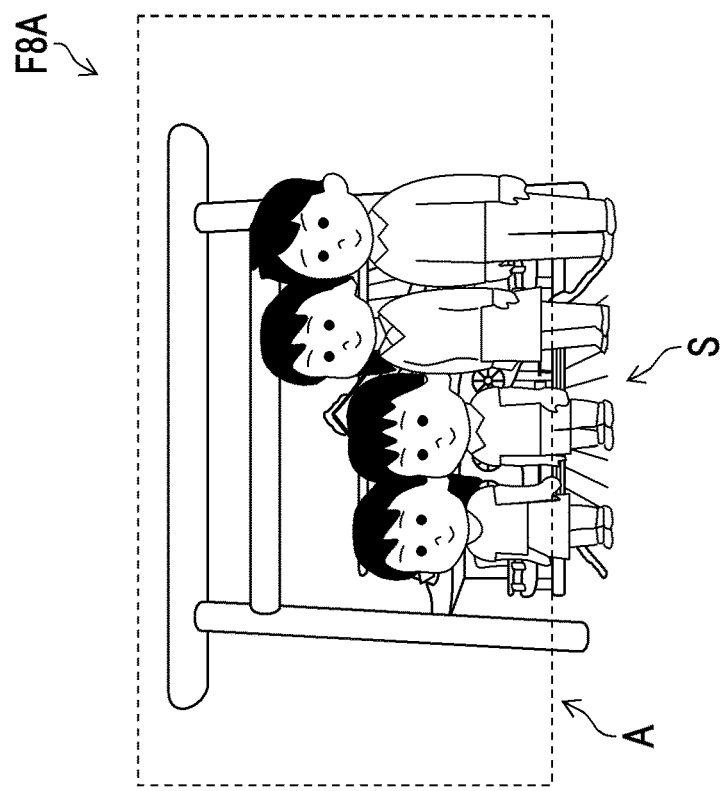

FIG. 9

| RECOGNITION LABEL | CANDIDATE |
|---|---|
| TEMPLE | {"寺","仏","院","堂","聖",…}<br>EACH PRONUNCED "TERA", "HOTOKE", "IN", "DOU", "SEI" IN JAPANESE.* |
| SHRINE | {"神","社","宮","聖","祠",…}<br>EACH PRONUNCED "KAMI", "SHA", "MIYA", "SEI", "HOKORA" IN JAPANESE.* |
| ⋮ | ⋮ |

* PRONUNCIATION IS SHOWN FOR EXPLANATION OF THE EMBODIMENT. IN THE EMBODIMENT, PRONUNCIATIONS NEED NOT TO BE STORED. AT LAST, CHINESE CHARACTER DATA (2 BYTES CHARACTER) NEED TO BE STORED IN THE EMBODIMENT.

FIG. 10

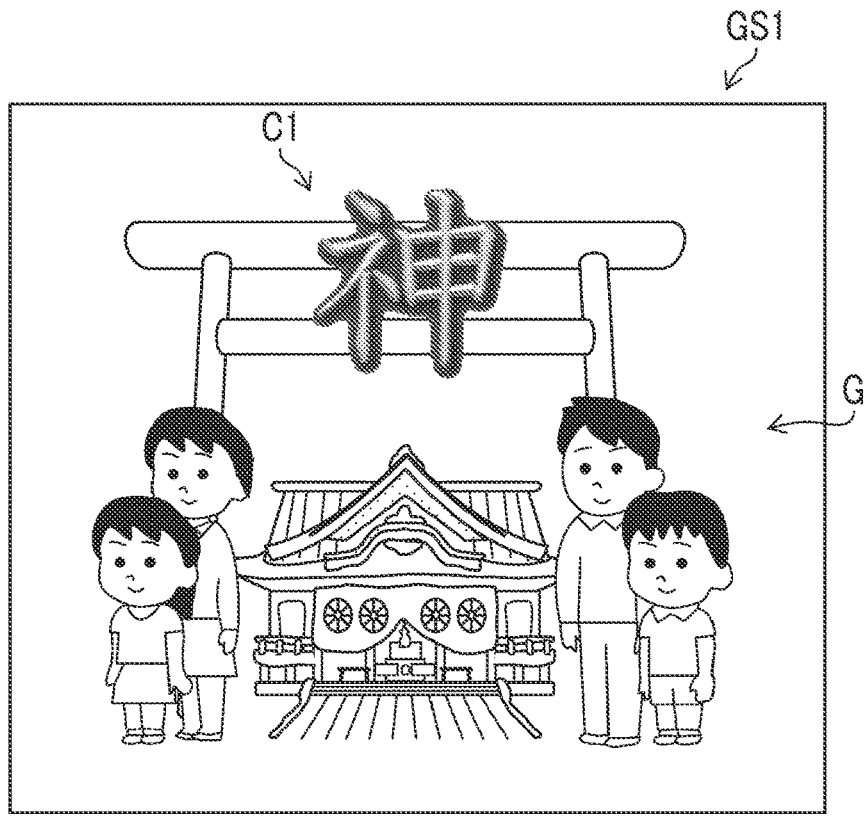

IMAGE PROCESSING DEVICE, IMAGE PROCESSING METHODS AND PROGRAMS, AND IMAGING APPARATUS

CROSS-REFERENCE TO RELATED APPLICATIONS

The present application is a Continuation of PCT International Application No. PCT/JP2020/012668 filed on Mar. 23, 2020 claiming priority under 35 U.S.C § 119(a) to Japanese Patent Application No. 2019-056587 filed on Mar. 25, 2019. Each of the above applications is hereby expressly incorporated by reference, in its entirety, into the present application.

BACKGROUND OF THE INVENTION

1. Field of the Invention

The present invention relates to an image processing device, an image processing method and program, and an imaging apparatus, and particularly relates to a technique for synthesizing a character or a character string with an image.

2. Description of the Related Art

There is a demand to obtain an image with a creative design suitable for the user's sensibility by synthesizing the image with characters that match the imaging scene of the image and the subject.

JP2014-165666A discloses a device that generates text having favorable consistency with human sensibilities in a case of viewing image data from the image data and generates new image data by synthesizing the image data and the text. For example, in a case where it is determined that the target image data is a portrait photo, text is generated in accordance with the level of smile of the person who is the subject image. The image data described in JP2014-165666A corresponds to an image, and the text corresponds to a character or a character string.

SUMMARY OF THE INVENTION

The device described in JP2014-165666A synthesizes a character or a character string with an image stored in a memory card or the like. However, in general photography, the subject of interest is often placed in the center of the angle of view. In a case where a character or a character string is intended to be synthesized with an image captured with the subject placed in the center in such a manner, there is restriction due to the layout balance. Thus, there may be no region for synthesis of the characters or the character strings, or it may not be possible to synthesize a character or a character string that is satisfactory for composition therefor.

Further, in the apparatus described in JP2014-165666A, the placement position of the character or the character string to be synthesized with the image is not considered. Therefore, the character or the character string may not be placed at an appropriate position. For example, in a case where the text placement position according to the level of smile of the person in the portrait photo is set at a position away from the person or at the position of the eyes of the person, the image is not preferable for the user.

The present invention has been made in view of such circumstances, and an object of the present invention is to provide an image processing device, an image processing method and program, and an imaging apparatus capable of assisting in capturing an image in which the character or the character string is laid out at an appropriate position.

According to an aspect, in order to achieve the above-mentioned object, there is provided an image processing device comprising: an image acquisition unit that acquires a time-series image group captured by an imaging unit; a character selection unit that selects a character or a character string from at least one image in the image group; an image selection unit that selects a target image, on which the character or the character string is placed, from the image group; a layout determination unit that determines a layout of the character or the character string in an image of the target image in accordance with meaning of the character or the character string; an assist information generation unit that generates imaging assist information for assisting in setting composition during imaging performed by the imaging unit; a synthesis unit that synthesizes the imaging assist information with the target image based on the determined layout; and a display control unit that displays the synthesized image on a display unit.

According to this aspect, the layout of the character or the character string in the image of the target image is determined in accordance with meaning of the characters or the character strings, the imaging assist information for assisting in setting composition during imaging performed by the imaging unit is generated, the imaging assist information is synthesized with the target image based on the determined layout, and the synthesized image is displayed on the display unit. Therefore, it is possible to assist in capturing the image in which the character or the character string is laid out at the appropriate position.

It is preferable that the image selection unit selects the image group as the target image, and the display control unit sequentially displays each image of the image group in which the imaging assist information is synthesized as a live view image. As a result, it is possible to assist in imaging by a live view image with which the character or the character string is synthesized.

It is preferable that the image selection unit selects one image in the image group as a target image. In addition, it is preferable that the display control unit sequentially displays each image of the image group as a live view image, and further displays the target image in which the imaging assist information is synthesized. As a result, it is possible to assist in imaging by the image displayed together with the live view image.

It is preferable that the imaging assist information includes the selected character or character string. As a result, it is possible to appropriately assist in imaging.

It is preferable that the imaging assist information includes a region display indicating a placement position of the character or the character string. As a result, it is possible to appropriately assist in imaging.

It is preferable that the layout determination unit includes a table in which a position of each character or each character string to be placed in an image is specified. As a result, the layout can be appropriately determined.

It is preferable that the image processing device further comprises a recognition unit that recognizes an object included in at least one image in the image group. In addition, it is preferable that the character selection unit selects the character or the character string in accordance with the recognized object. Thereby, it is possible to synthesize the character or the character string in accordance with the object included in the image.

It is preferable that the image processing device further comprises a score calculation unit that calculates a score for each object included in at least one image in the image group. In addition, it is preferable that the recognition unit recognizes the object from the score. Thereby, it is possible to appropriately recognize the object.

It is preferable that the image processing device further comprises a storage unit that stores a plurality of candidates for the characters or the character strings for each object. In addition, it is preferable that the character selection unit selects the character or the character string from the plurality of candidates corresponding to the recognized object. Thereby, it is possible to appropriately select a character or a character string.

It is preferable that the character selection unit selects one Chinese character. As a result, one Chinese character can be synthesized with the image.

The time-series image group may be an image group captured within a constant time.

According to an aspect, in order to achieve the above object, there is provided an imaging apparatus comprising: the image processing device described above; an imaging unit that captures a time-series image group; and a display unit that displays images.

According to this aspect, the layout of the character or the character string in the image of the target image is determined in accordance with meaning of the characters or the character strings, the imaging assist information for assisting in setting composition during imaging performed by the imaging unit is generated, the imaging assist information is synthesized with the target image based on the determined layout, and the synthesized image is displayed on the display unit. Therefore, it is possible to assist in capturing the image in which the character or the character string is laid out at the appropriate position.

According to an aspect, in order to achieve the above object, there is provided an image processing method comprising: an image acquisition process of acquiring a time-series image group captured by an imaging unit; a character selection process of selecting a character or a character string from at least one image in the image group; an image selection process of selecting a target image, on which the character or the character string is placed, from the image group; a layout determination process of determining a layout of the character or the character string in the image of the target image in accordance with meaning of the character or the character string; an assist information generation process of generating imaging assist information for assisting in setting composition during imaging performed by the imaging unit; a synthesis process of synthesizing the imaging assist information with the target image based on the determined layout; and a display control process of displaying the synthesized image on a display unit.

According to this aspect, the layout of the character or the character string in the image of the target image is determined in accordance with meaning of the characters or the character strings, the imaging assist information for assisting in setting composition during imaging performed by the imaging unit is generated, the imaging assist information is synthesized with the target image based on the determined layout, and the synthesized image is displayed on the display unit. Therefore, it is possible to assist in capturing the image in which the character or the character string is laid out at the appropriate position. A program for causing a computer to execute the above image processing method is also included in this aspect.

According to the present invention, it is possible to assist in capturing an image in which the character or the character string is laid out at the appropriate position.

BRIEF DESCRIPTION OF THE DRAWINGS

FIG. 8 is a diagram for explaining an example of score calculation by the score calculation unit 106.

FIG. 9 is a diagram showing an example of a correspondence table of Chinese character candidates corresponding to recognition labels stored in the candidate storage unit 110.

FIG. 10 is a diagram showing an example of a synthesized image GS1.

DESCRIPTION OF THE PREFERRED EMBODIMENTS

Hereinafter, preferred embodiments of the present invention will be described in detail with reference to the accompanying drawings.

<Mobile Terminal Device>

The image processing device according to the present embodiment is mounted on, for example, an imaging apparatus. The mobile terminal device, which is an embodiment of the imaging apparatus, includes, for example, a mobile phone, a personal handyphone system (PHS), a smartphone, a personal digital assistant (PDA), a tablet computer terminal, a notebook personal computer terminal, and a portable game machine. Hereinafter, a smartphone will be taken as an example and will be described in detail with reference to the drawings.

[Appearance of Smartphone]

Figure 1:
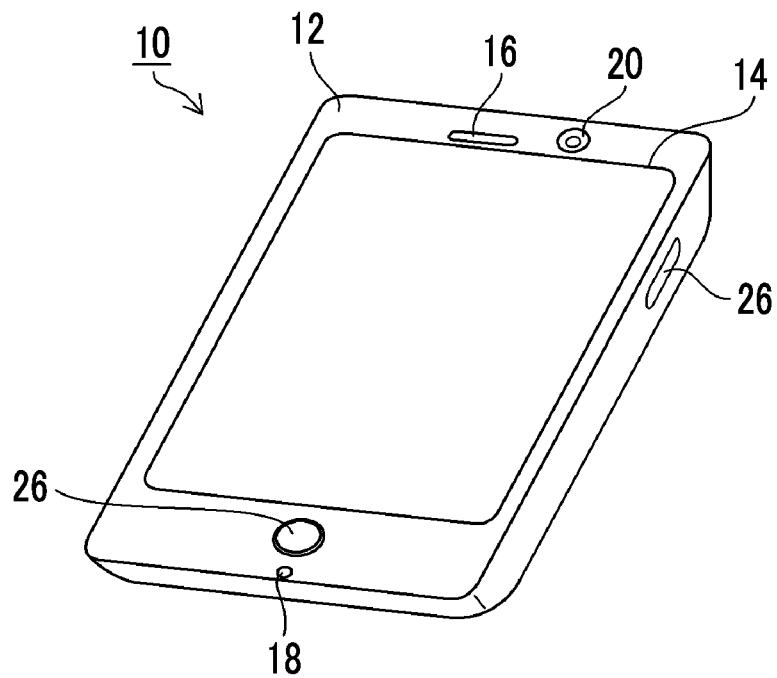
FIG. 1 is a front perspective view of a smartphone 10.

FIG. 1 is a front perspective view of the smartphone 10 according to the present embodiment. As shown in FIG. 1, the smartphone 10 has a flat plate-shaped housing 12. The smartphone 10 includes a touch panel display 14, a speaker 16, a microphone 18, and a camera 20 in front of the housing 12.

The touch panel display 14 includes a display unit (an example of a display unit) such as a color liquid crystal display (LCD) panel for displaying an image or the like, and a touch panel unit such as a transparent electrode which is disposed in front of the display unit and accepts touch input.

The touch panel unit has a light-transmitting substrate body, a light-transmitting position detection electrode which is provided on the substrate body in a planar shape, and a capacitance-type touch panel having an insulating layer provided on the position detection electrode. The touch panel unit generates and outputs two-dimensional position coordinate information corresponding to the user's touch operation.

The speaker 16 is a sound output unit that outputs sound. The microphone 18 is a sound input unit into which sound is input. The camera 20 is an imaging unit that captures videos and still images.

Figure 2:
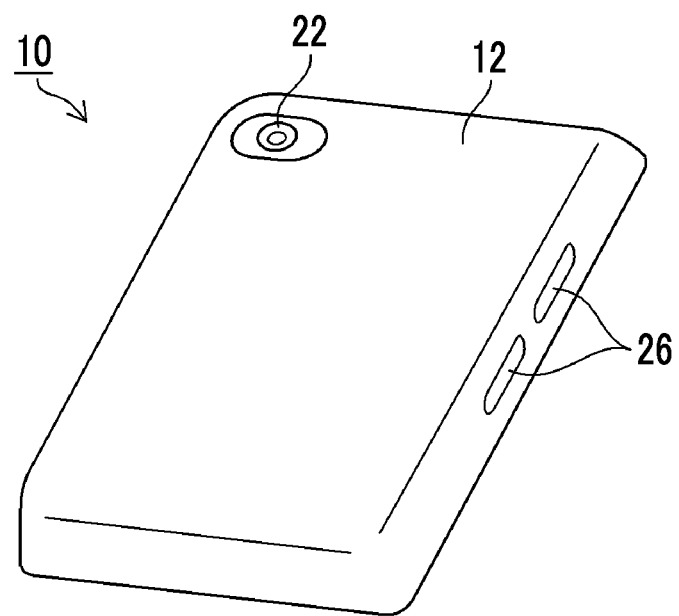
FIG. 2 is a rear perspective view of the smartphone 10.

FIG. 2 is a rear perspective view of the smartphone 10. As shown in FIG. 2, the smartphone 10 includes a camera 22 on the rear surface of the housing 12. The camera 22 is an imaging unit that captures videos and still images.

Further, as shown in FIGS. 1 and 2, the smartphone 10 comprises switches 26 provided respectively on the front surface and the side surface of the housing 12. The switch 26 is an input unit that receives an instruction from the user. The switch 26 is a push button type switch that is turned on in a case where pressed with a finger or the like and turned off by a restoring force such as a spring in a case where the finger is released.

The configuration of the housing 12 is not limited to this, and a configuration having a folding structure or a slide mechanism may be adopted.

[Electrical Configuration of Smartphone]

Figure 3:
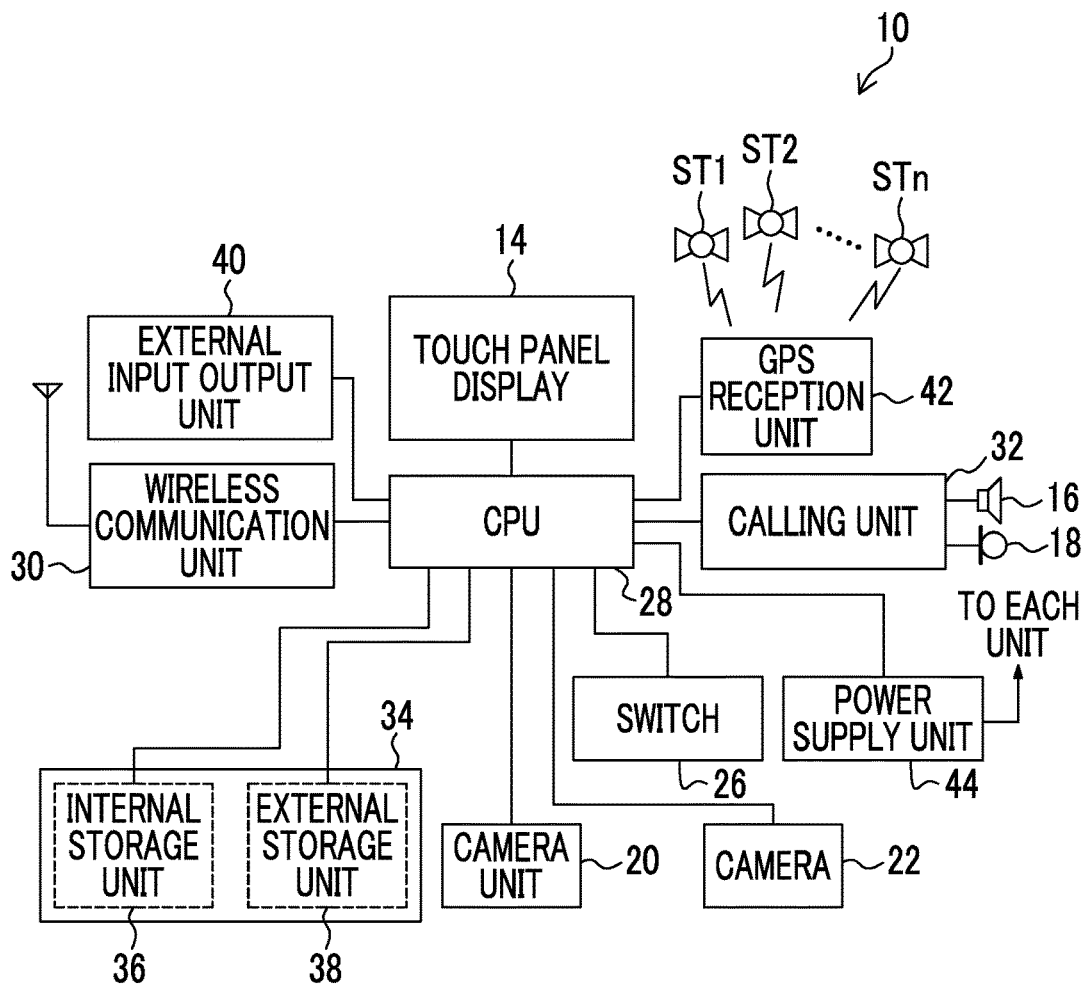
FIG. 3 is a block diagram showing an electrical configuration of a smartphone 10.

FIG. 3 is a block diagram showing an electrical configuration of the smartphone 10. As shown in FIG. 3, the smartphone 10 includes not only the touch panel display 14, speaker 16, the microphone 18, the camera 20, the camera 22, and the switch 26 described above, but also includes a central processing unit (CPU) 28, a wireless communication unit 30, a calling unit 32, a storage unit 34, an external input output unit 40, a global positioning system (GPS) reception unit 42, and a power supply unit 44. Further, the smartphone 10 has, as a main function, a wireless communication function for performing mobile wireless communication through a base station device and a mobile communication network.

The CPU 28 operates in accordance with the control program and control data stored in the storage unit 34, and controls each unit of the smartphone 10 in an integrated manner. The CPU 28 has a mobile communication control function for controlling each part of the communication system and an application processing function in order to perform sound communication and data communication through the wireless communication unit 30.

The CPU 28 also has an image processing function for displaying videos, still images, characters, and the like on the touch panel display 14. With this image processing function, information such as still images, videos, and characters is visually transmitted to the user. Further, the CPU 28 acquires two-dimensional position coordinate information corresponding to the user's touch operation from the touch panel unit of the touch panel display 14. Further, the CPU 28 acquires an input signal from the switch 26.

The hardware structure of the CPU 28 is various processors as shown below. Various processors include a central processing unit (CPU) as a general-purpose processor which functions as various function units by executing software (programs); a graphics processing unit (GPU) as a processor specialized in image processing; a programmable logic device (PLD) as a processor capable of changing a circuit configuration after manufacturing a field programmable gate array (FPGA); and a dedicated electrical circuit as a processor, which has a circuit configuration specifically designed to execute specific processing, such as an application specific integrated circuit (ASIC).

One processing unit may be composed of one of these various processors, or two or more processors of the same type or different types (for example, a plurality of FPGAs, or a combination of a CPU and an FPGA, or a combination of a CPU and a GPU). Further, the plurality of function units may be composed of one processor. In an example in which a plurality of function units are configured by one processor, first, as represented by a computer such as a client or a server, one processor is configured by a combination of one or more CPUs and software, and this processor operates as a plurality of function units. Second, as represented by a system-on-chip (SoC), there is a form in which a processor that implements the functions of the whole system including the plurality of function units by one integrated circuit (IC) chip is used. As described above, the various function units are configured by using one or more of the various processors as a hardware structure.

Further, the hardware structure of these various processors is more specifically an electric circuit (circuitry) in which circuit elements such as semiconductor elements are synthesized.

Figure 4:
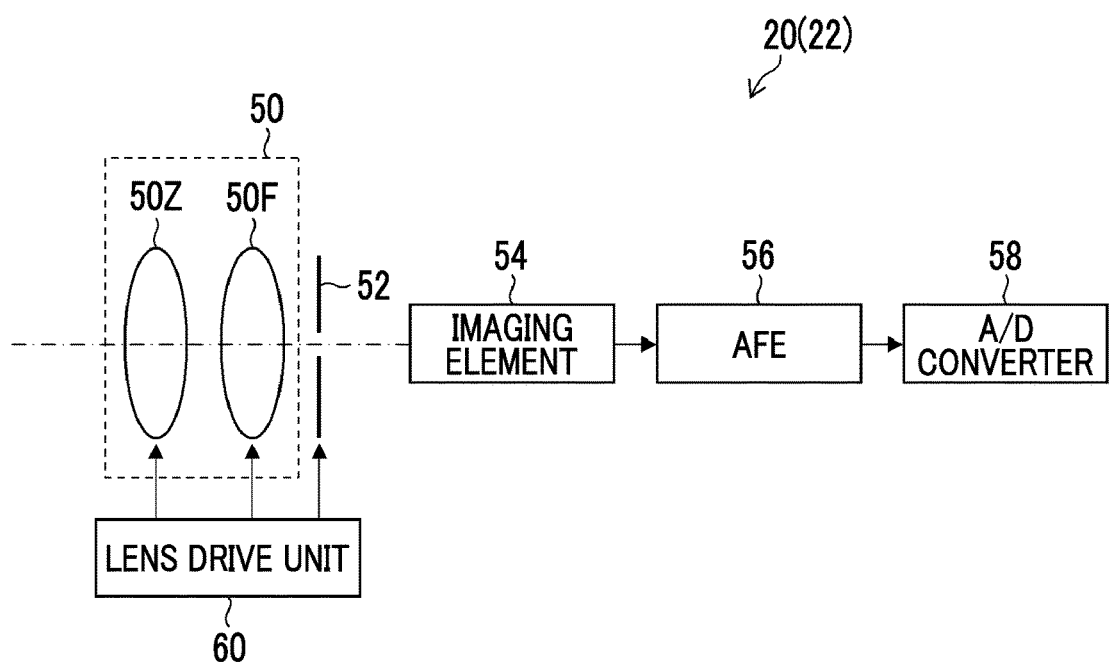
FIG. 4 is a block diagram showing an internal configuration of the camera 20.

The camera 20 and the camera 22 capture videos and still images in accordance with the instructions of the CPU 28. FIG. 4 is a block diagram showing an internal configuration of the camera 20. The internal configuration of the camera 22 is the same as that of the camera 20. As shown in FIG. 4, the camera 20 comprises an imaging lens 50, an aperture 52, an imaging element 54, an analog front end (AFE) 56, an analog to digital (A/D) converter 58, and a lens drive unit 60.

The imaging lens 50 is composed of a zoom lens 50Z and a focus lens 50F. The lens drive unit 60 drives the zoom lens 50Z and the focus lens 50F forward and backward in response to a command from the CPU 28 to perform zoom (optical zoom) adjustment and focus adjustment. Further, the lens drive unit 60 controls the aperture 52 in response to a command from the CPU 28 to adjust the exposure. Information, such as the positions of the zoom lens 50Z and the focus lens 50F and the degree of opening of the aperture 52, is input to the CPU 28.

The imaging element 54 comprises a light receiving surface in which a large number of light receiving elements are placed in a matrix. The subject light transmitted through the zoom lens 50Z, the focus lens 50F, and the aperture 52 is imaged on the light receiving surface of the imaging element 54. A red (R), green (G), or blue (B) color filter is provided on the light receiving surface of the imaging element 54. Each light receiving element of the imaging element 54 converts the subject light imaged on the light receiving surface into an electric signal based on the signals of the colors R, G, and B. As a result, the imaging element 54 acquires a color image of the subject. As the imaging element 54, a photoelectric conversion element such as complementary metal-oxide semiconductor (CMOS) or charge-coupled device (CCD) can be used.

The AFE 56 removes noise from the analog image signal which is output from the imaging element 54, amplifies the signal, and so on. The A/D converter 58 converts the analog image signal which is input from the AFE 56 into a digital image signal having a gradation width. An electronic shutter is used as the shutter for controlling the exposure time of the incident light on the imaging element 54. In the case of an electronic shutter, the exposure time (shutter speed) can be adjusted by controlling the charge accumulation period of the imaging element 54 by the CPU 28.

The camera 20 may convert image data of the captured video and still image into compressed image data such as moving picture experts group (MPEG) or joint photographic experts group (JPEG).

Returning to the description of FIG. 3, the CPU 28 stores the video and the still image captured by the camera 20 and the camera 22 in the storage unit 34. Further, the CPU 28 may output the video and the still image captured by the camera 20 and the camera 22 to the outside of the smartphone 10 through the wireless communication unit 30 or the external input output unit 40.

Further, the CPU 28 displays the video and the still image captured by the camera 20 and the camera 22 on the touch panel display 14. The CPU 28 may use the video and the still image captured by the camera 20 and the camera 22 in the application software.

The wireless communication unit 30 performs wireless communication with the base station device accommodated in the mobile communication network in accordance with the instruction of the CPU 28. The smartphone 10 sends and receives various file data such as sound data and image data, e-mail data, and the like, and receives Web (abbreviation of World Wide Web) data and streaming data, by using this wireless communication.

The speaker 16 and the microphone 18 are connected to the calling unit 32. The calling unit 32 decodes the sound data received by the wireless communication unit 30 and outputs the sound data from the speaker 16. The calling unit 32 converts the user's sound, which is input through the microphone 18, into sound data, which can be processed by the CPU 28, and outputs the sound data to the CPU 28.

The storage unit 34 is composed of an internal storage unit 36 built in the smartphone 10 and an external storage unit 38 that can be attached to and detached from the smartphone 10. The internal storage unit 36 and the external storage unit 38 are implemented by using a known storage medium.

The storage unit 34 stores the control program of the CPU 28, the control data, the application software, the address data associated with the name and telephone number of the communication partner, the transmitted received e-mail data, the Web data downloaded by Web browsing, the downloaded content data, and the like. Further, the storage unit 34 may temporarily store streaming data and the like.

The external input output unit 40 serves as an interface with an external device connected to the smartphone 10. The smartphone 10 is directly or indirectly connected to another external device by communication or the like through the external input output unit 40. The external input output unit 40 transmits the data received from the external device to each component inside the smartphone 10 and transmits the data inside the smartphone 10 to the external device.

Means for communication or the like include, for example, universal serial bus (USB), institute of electrical and electronics engineers (IEEE) 1394, Internet, wireless local area network (LAN), Bluetooth (registered trademark), radio frequency identification (RFID), and infrared communication. The external devices are, for example, headsets, external chargers, data ports, sound devices, video devices, smartphones, PDAs, personal computers, and earphones.

The GPS reception unit 42 detects the position of the smartphone 10 based on the positioning information from the GPS satellites ST1, ST2, . . . , STn.

The power supply unit 44 is a power supply source that supplies electric power to each unit of the smartphone 10 through a power supply circuit which is not shown. The power supply unit 44 includes a lithium ion secondary battery. The power supply unit 44 may include an A/D conversion unit that generates a DC voltage from an external AC power supply.

The smartphone 10 configured in such a manner is set to the imaging mode by inputting an instruction from the user using the touch panel display 14 or the like, and the camera 20 and the camera 22 are able to capture a video and a still image.

In a case where the smartphone 10 is set to the imaging mode, the imaging standby state is set, a video is captured by the camera 20 or the camera 22, and the captured video is displayed on the touch panel display 14 as a live view image.

The user is able to visually recognize the live view image displayed on the touch panel display 14, determine the composition, confirm the subject to be captured, and set the imaging conditions.

In a case where the smartphone 10 is instructed to capture an image by inputting an instruction from the user using the touch panel display 14 or the like in the imaging standby state, the smartphone 10 performs autofocus (AF) and auto exposure (AE) control to capture and store a video or a still image.

<Image Processing Device>

Figure 5:
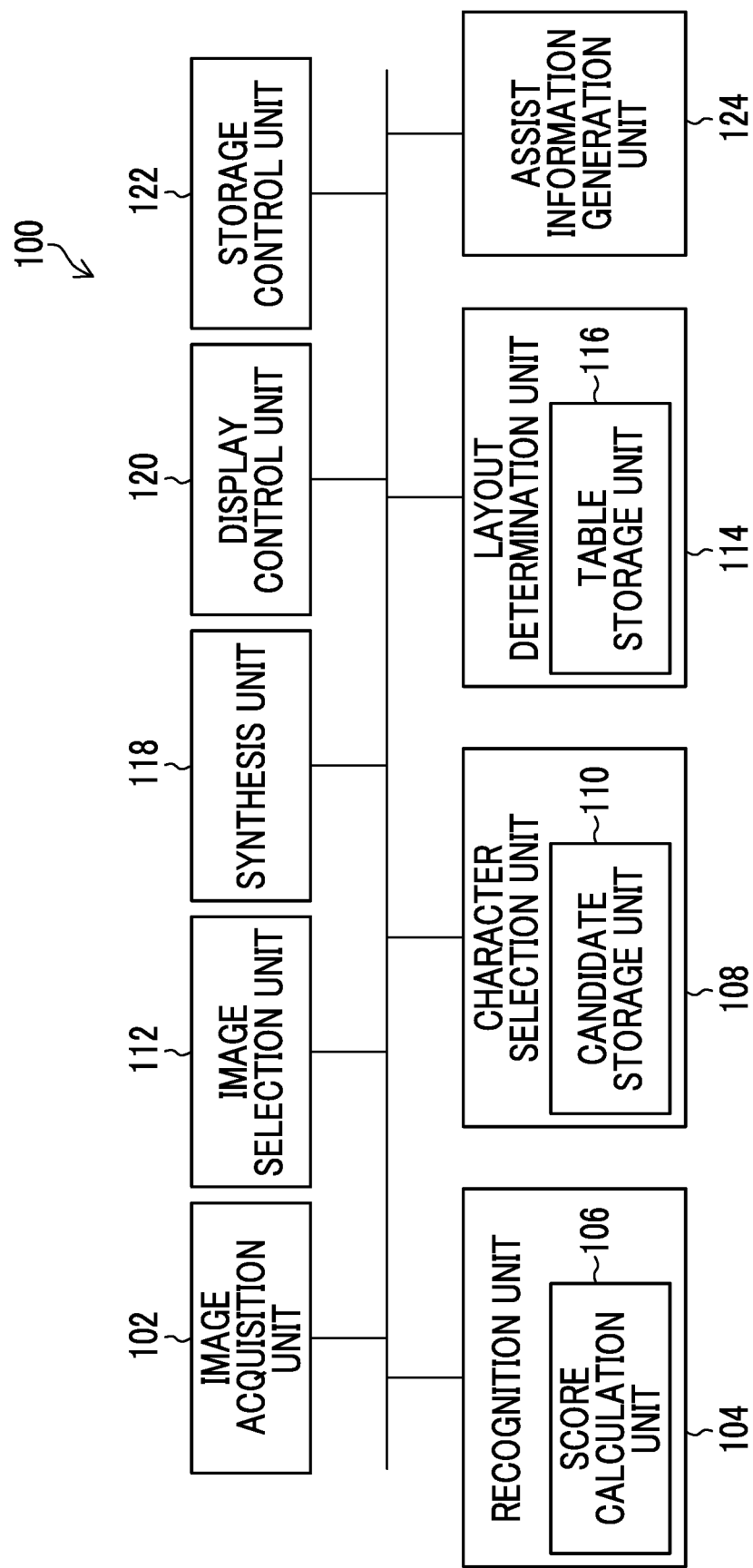
FIG. 5 is a block diagram showing an example of a functional configuration of the image processing device 100.

The image processing device according to the present embodiment assists in capturing an image in which the character or the character string is laid out at the appropriate position. FIG. 5 is a block diagram showing an example of the functional configuration of the image processing device 100. The image processing device 100 comprises an image acquisition unit 102, a recognition unit 104, a character selection unit 108, an image selection unit 112, a layout determination unit 114, a synthesis unit 118, a display control unit 120, a storage control unit 122, and an assist information generation unit 124. The image processing device 100 is mounted on the smartphone 10. The image processing device 100 is implemented by, for example, a CPU 28.

The image acquisition unit 102 acquires a time-series image group. For example, the image acquisition unit 102 acquires an image group (video) captured at a constant frame rate which is output from the camera 20. The image acquisition unit 102 may acquire a time-series image group by reading the image group stored in the storage unit 34, or may acquire a time-series image group through the wireless communication unit 30 or the external input output unit 40.

The recognition unit 104 recognizes the objects included in the image group acquired by the image acquisition unit 102. Examples of objects include living things (people, fish, dogs, and the like), food and drink (sushi, meat, noodles, and the like), structures (towers, temples, buildings, and the like), and nature (sky, mountains, trees, and the like). However, the object is not limited to these, and any object that can be captured by the smartphone 10 may be used.

The recognition unit 104 includes a score calculation unit 106. The score calculation unit 106 calculates the score for each object included in the image group. The score calculation unit 106 includes a convolutional neural network (CNN) that calculates the feature amount of each image of the image group and performs the recognition processing of the object in the image. The CNN calculates a score that is a relatively high value, as the probability that an object is included for each object is high. The recognition unit 104 recognizes the object having the highest score calculated by the score calculation unit 106 as an object included in the image group.

The recognition unit 104 may calculate feature amounts such as contour information and color information of objects in each image of the image group, and recognize the objects in the image using the calculated feature amounts. Further, a priority may be given to each object in advance, and the recognition unit 104 may recognize the object having the highest priority among the recognized plurality of objects as an object included in the image group.

The character selection unit 108 selects a character or a character string from at least one image in the image group acquired by the image acquisition unit 102. The character selection unit 108 may select a character or a character string including a Chinese character corresponding to the object recognized by the recognition unit 104. Chinese character is a logogram used to describe Japanese, Chinese, and Korean.

The character selection unit 108 includes a candidate storage unit 110. The candidate storage unit 110 stores a plurality of candidates of characters or character strings corresponding to the objects for each object. The character selection unit 108 selects one character or one character string from a plurality of candidates corresponding to the objects recognized by the recognition unit 104 among the candidates stored in the candidate storage unit 110. The storage unit 34 (refer to FIG. 3) may comprise the candidate storage unit 110.

As the character selection unit 108, the CNN, which calculates the feature amount of each image of the input image or the image group and performs the selection processing of the character or the character string symbolizing the input image or the image group, may be used.

The image selection unit 112 selects a target image on which the character or the character string is placed from the image group acquired by the image acquisition unit 102. The image selection unit 112 may select an image having a relatively high score of the object recognized by the recognition unit 104 as the target image.

The layout determination unit 114 determines a layout of the character or the character string in the image of the target image selected by the image selection unit 112. The layout determination unit 114 determines a layout in accordance with meaning of the character or the character string. The layout according to meaning is, for example, a layout in which the character or the character string symbolizing an object in an image is placed at a position near the object or a position superimposed on the object.

The layout determination unit 114 comprises a table storage unit 116. The table storage unit 116 stores a table in which a position to be placed in the image is specified for each character or character string. That is, in the table stored in the table storage unit 116, placement positions corresponding to the meanings of the characters or the character strings are associated with each character or character string. The layout determination unit 114 reads, from the table storage unit 116, the placement position corresponding to the character or the character string selected by the character selection unit 108 from the table storage unit 116, and determines the layout in which the character or the character string is placed at the read placement position in the target image. The table storage unit 116 may be provided by the storage unit 34 (refer to FIG. 3).

The synthesis unit 118 generates a synthesized image in which the character or the character string are synthesized with the target image based on the layout determined by the layout determination unit 114.

The display control unit 120 causes the touch panel display 14 to display the synthesized image synthesized by the synthesis unit 118. Further, the storage control unit 122 stores the synthesized image synthesized by the synthesis unit 118 in the storage unit 34. The storage control unit 122 may cause the storage unit 34 to store, instead of the synthesized image or together with the synthesized image, the target image selected by the image selection unit 112, the character or the character string selected by the character selection unit 108, and the layout information determined by the layout determination unit 114 in association with each other.

The assist information generation unit 124 generates imaging assist information. The imaging assist information is information for assisting the user in setting the composition in a case of capturing an image in which the character or the character string is synthesized.

The imaging assist information is, for example, information including the character or the character string selected by the character selection unit 108. Further, the imaging assist information may be information including a region display indicating the placement position of the character or the character string selected by the character selection unit 108.

The synthesis unit 118 synthesizes the assist information generated by the assist information generation unit 124 with the target image selected by the image selection unit 112 based on the layout determined by the layout determination unit 114. The display control unit 120 causes the touch panel display 14 to display a synthesized image in which assist information is synthesized with the target image.

[Image Processing Method]

An image processing method using the image processing device 100 will be described. In the smartphone 10, the CPU 28 reads out the image processing program stored in the storage unit 34 and executes the image processing program in response to an instruction input from the user using the touch panel display 14 or the like. As a result, the image processing method is implemented. The image processing method according to the present embodiment assists in capturing an image in which the character or the character string is laid out at the appropriate position.

Figure 6:
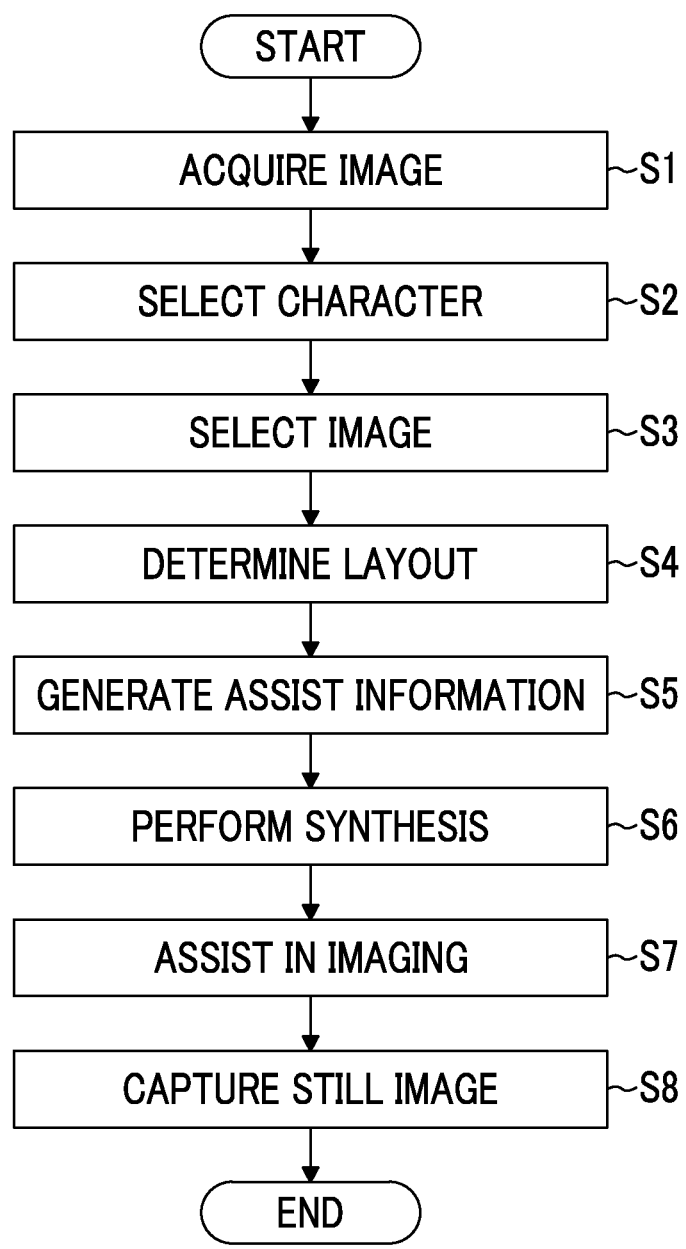
FIG. 6 is a flowchart showing each processing of the image processing method.

FIG. 6 is a flowchart showing each processing of the image processing method according to the present embodiment. The image processing method includes an image acquisition process (step S1), a character selection process (step S2), an image selection process (step S3), a layout determination process (step S4), an assist information generation process (step S5), and a synthesis process (step S6), an imaging assist process (step S7), and a still imaging process (step S8).

In step S1, the image acquisition unit 102 acquires a time-series image group. Here, it is assumed that the user is capturing the live view image in the imaging standby state of the camera 22. Therefore, the touch panel display 14 displays a live view image captured by the user. The image acquisition unit 102 acquires a video for a live view image captured at a constant frame rate which is output from the camera 22.

It should be noted that the image acquisition unit 102 does not acquire an image group consisting of all the images constituting the video for the live view image as a time-series image group, but may acquire an image group captured within the latest constant time or may acquire an image group sampled at a frame rate coarser than the frame rate of the live view image. Further, the image acquisition unit 102 may acquire an image group captured within a constant time as a time-series image group. The image group captured within a constant time may be, for example, an image group consisting of a plurality of images including the date data attached to the image within a constant time, or an image group consisting of a plurality of images in which the date data attached to the image is continuous. Further, the image acquisition unit 102 may acquire a time-series image group which is read from the storage unit 34, or may acquire a time-series image group from an external server through the wireless communication unit 30 or the external input output unit 40.

In step S2, the character selection unit 108 selects a character or a character string from the image group acquired in step S1. Here, the character selection unit 108 selects one (single) Chinese character used in Japanese. The Chinese character corresponds to the object recognized by the recognition unit 104.

For this purpose, the score calculation unit 106 calculates the score for each object included in the image group acquired in step S1. The score calculated by the score calculation unit 106 is also referred to as certainty or reliability, and the higher the possibility that the object is included, the larger the value.

Figure 7:
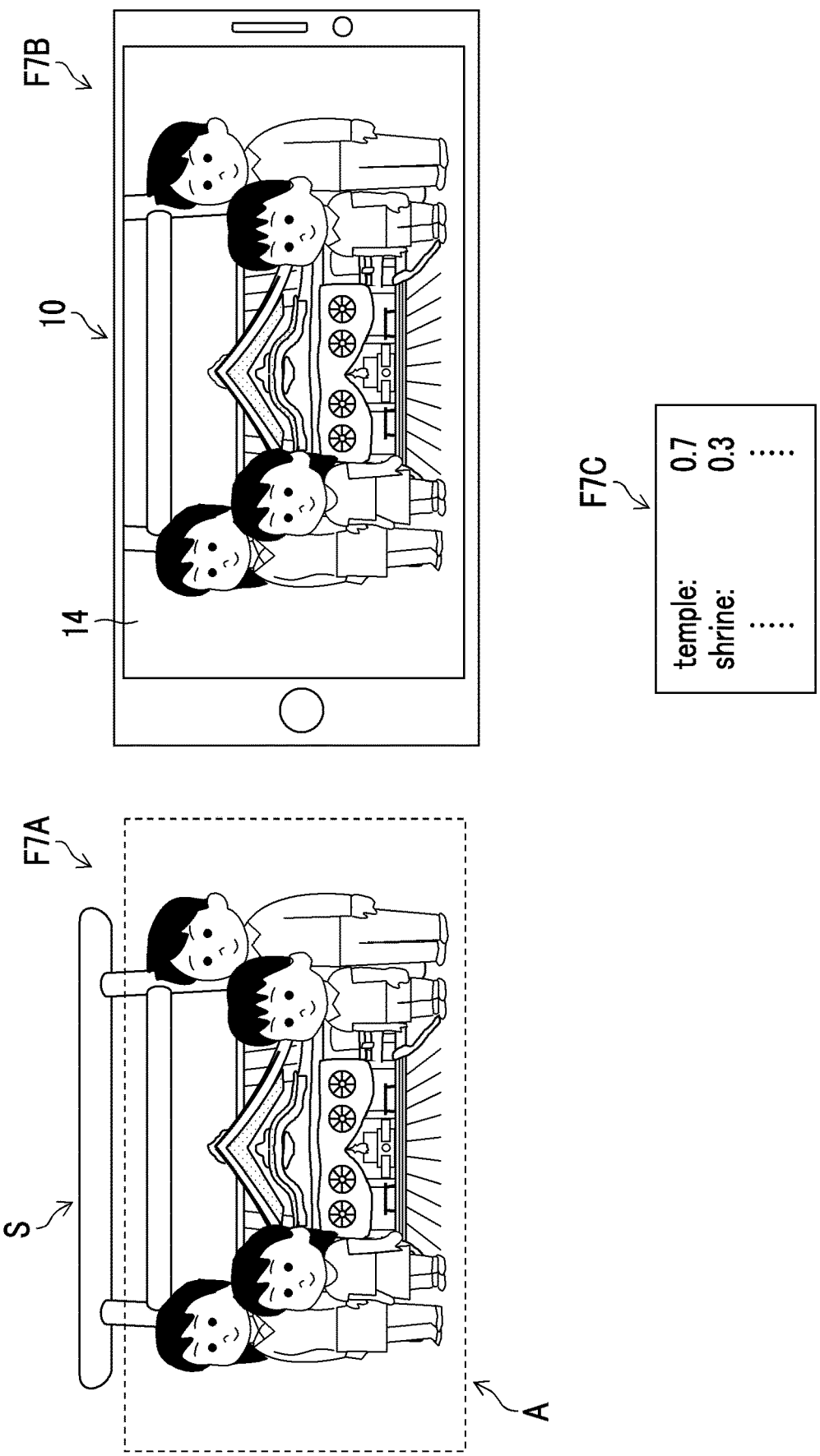
FIG. 7 is a diagram for explaining an example of score calculation by the score calculation unit 106.

FIG. 7 is a diagram for explaining an example of score calculation by the score calculation unit 106. F7A shown in FIG. 7 shows the subject S at a certain timing in the imaging of the live view image and the angle of view A of the camera 22. The subject S includes the torii gate of the shrine, the main shrine at the back of the torii gate, and four people. The angle of view A is a region inside the broken line rectangle. F7B shown in FIG. 7 shows a smartphone 10 in which an image captured at the timing of F7A is displayed on the touch panel display 14. Further, F7C shown in FIG. 7 shows a pair of the recognition label of the recognition result of the image captured at the timing of F7A and the score of the recognition result.

As shown in F7A and F7B, the angle of view A does not include the upper part of the torii gate in the subject S in the image captured at the timing of F7A. In addition, the main shrine in the back is included in the angle of view A without being hidden. Therefore, the image captured at this timing does not include the torii gate, so that the score of the recognition label "shrine" indicating the shrine is relatively small. In addition, the image includes constructs of the shrines and temples without torii gate, so that the score of the recognition label "temple" indicating the temple is a relatively large value.

Here, as shown in F7C, the score calculation unit 106 calculates the score of the recognition label "temple" as "0.7" and the score of the recognition label "shrine" as "0.3". The score of each object calculated by the score calculation unit 106 is 1 in total.

FIG. 8 is a diagram for explaining another example of score calculation by the score calculation unit 106. F8A shown in FIG. 8 shows the subject S and the angle of view A of the camera 22 at different timings from those in FIG. 7 in the imaging of the live view image. The subject S includes the torii gate of the shrine, the main shrine at the back of the torii gate, and four people, but the placement of the people is different from that at the timing shown in FIG. 7A.

F8B shown in FIG. 8 shows a smartphone 10 in which an image captured at the timing of F8A is displayed on the touch panel display 14. Further, F8C shown in FIG. 8 shows a pair of the recognition label of the recognition result of the image captured at the timing of F8A and the score of the recognition result.

As shown in F8A and F8B, the image captured at the timing of F8A includes the most part of the torii gate of the subject S. In addition, the image does not include the main shrine in the back of the subject S since the main shrine is hidden by a person. Therefore, the image captured at this timing includes the torii gate, so that the score of the recognition label "shrine" indicating the shrine is relatively large. In addition, the image does not include constructs of the shrines and temples without torii gate, so that the score of the recognition label "temple" indicating the temple is a relatively small value.

Here, as shown in F8C, the score calculation unit 106 calculates the score of the recognition label "temple" as "0.1" and the score of the recognition label "shrine" as "0.8".

The recognition unit 104 derives the final recognition label for the object of the image group from the score for each object calculated by the score calculation unit 106 for each image of the image group acquired in step S1. The score calculation unit 106 may calculate the score for each object of each image of the image group, and the recognition unit 104 may recognize the object included in the image group from the average or the sum of the scores of each image for each object. Here, it is assumed that the recognition unit 104 determines that the recognition label "shrine" having the largest average of scores for each image is most suitable as an object.

Next, the character selection unit 108 selects one character or one character string from a plurality of candidates corresponding to the objects recognized by the recognition unit 104 among the candidates stored in the candidate storage unit 110. That is, one Chinese character is selected from a plurality of candidates corresponding to the recognition label "shrine".

FIG. 9 is a diagram showing an example of a correspondence table of Chinese character candidates corresponding to the recognition labels stored in the candidate storage unit 110. The candidate storage unit 110 stores Chinese character candidates for each recognition result label in descending order of priority. As shown in FIG. 9, as Chinese character candidates for the recognition label "temple", Chinese characters such as "Tera", "Hotoke", "In", "Dou", and "Sei" (Here, each Chinese character is expressed in Japanese pronunciation.) are stored to correspond to the recognition label. Each Chinese character has related meaning with temple. In addition, as Chinese character candidates for the recognition label "shrine", Chinese character such as "Kami", "Sha", "Miya", "Sei", and "Hokora" are stored to correspond to the recognition label. Each Chinese character has related meaning with shrine. The recognition labels can be determined and stored in advance or can be added by the user. Chinese characters corresponding to each recognition label can be determined and stored in advance or can be added by the user. Note that pronunciation is shown for explanation of the embodiment. In the embodiment, pronunciations need not to be stored. At least, Chinese character data (2 bytes character) need to be stored in the embodiment.

Here, since the recognition label is "shrine", the character selection unit 108 selects one Chinese character from candidates such as "Kami", "Sha", "Miya", "Sei", and "Hokora". Here, it is assumed that the character selection unit 108 selects the first "Kami" having the highest priority. The character selection unit 108 may adopt a mode of selecting a Chinese character having a large number of strokes, a mode of selecting a Chinese character having a small number of strokes, and a mode of more preferentially selecting a Chinese character having the better left-right symmetry.

Here, an example in which the character selection unit 108 selects a character or a character string from a time-series image group has been described, but a character or a character string may be selected from one image. In such a case, for example, the selection may be determined from the image of the latest frame among the videos for the live view image captured.

Further, the recognition unit 104 may determine from the image group acquired in step S1 that a plurality of recognition labels are suitable as objects. For example, in a case where the average of scores of the images with the highest score is close to the average of scores of the second largest recognition label, both recognition labels may be determined to be the most suitable objects. The recognition unit 104 is able to determine that the averages are close to each other in a case where the difference between the averages of the images of the scores is within a predetermined threshold value. As long as the difference between the averages of the averages of the images of the scores is within a predetermined threshold value, a recognition label having a third or higher average score may be included. Here, the case where the average scores are close to each other has been described, but the same applies in a case where the sum of the scores is used.

Further, the character selection unit 108 selects one Chinese character even in a case where the recognition unit 104 determines that a plurality of recognition labels are suitable as objects. In a case of selecting one Chinese character from a plurality of recognition labels, the character selection unit 108 may select the Chinese character that each recognition label has in common among the Chinese characters stored in the candidate storage unit 110 for the plurality of recognition labels.

For example, it is assumed that the average of scores for each image calculated by the score calculation unit 106 is 0.52 for the largest recognition label "shrine", 0.48 for the second largest recognition label "temple", and the threshold value for determining that the averages are close to each other is 0.05. In such a case, the recognition unit 104 determines that the average of scores of the recognition label "shrine" and the average of scores of the recognition label "temple" are close to each other, and recognizes the two "shrine" and "temple" as the recognition labels which are suitable as the objects.

In response to this, the character selection unit 108 selects the Chinese character "Sei", which is common to the two recognition labels, among the Chinese characters stored in the candidate storage unit 110 for "shrine" and the Chinese characters stored in the candidate storage unit 110 for "temple".

In such a manner, even in a case where there are a plurality of objects recognized by the recognition unit 104, the character selection unit 108 is able to select an appropriate one Chinese character according to the image group.

Returning to the description of FIG. 6, in step S3, the image selection unit 112 selects a target image, on which the character or the character string selected in step S2 is placed, from the image group acquired in step S1. Here, the image selection unit 112 selects an image having the highest score (an example of an image having a relatively high score) of the object recognized by the recognition unit 104 as the target image. In this example, the final recognition label recognized by the recognition unit 104 is "shrine". Therefore, the image selection unit 112 selects the image having the highest score of the recognition label "shrine" from the image group acquired in step S1 as the target image.

The image selection unit 112 may set, as a target image, an image in which a large number of people are shown, an image in which there are many front faces of a person, an image in which camera shake does not occur, or an image having a region (for example, the sky) in which characters can be easily placed.

In step S4, the layout determination unit 114 determines a layout of the character or the character string in the image of the target image selected by the image selection unit 112. Here, the layout is determined based on the table stored in the table storage unit 116. The layout determination unit 114 reads, from the table storage unit 116, the position to be placed corresponding to one Chinese character "Kami" selected by the character selection unit 108 from the table storage unit 116. The position where the "Kami" should be placed in the central portion of the torii gate.

The position where the character should be placed may be, for example, a position for avoiding an object such as a person, a position for overlapping the object, or the like, depending on the object recognized by the recognition unit 104.

Further, the layout determination unit 114 may determine not only the placement of the character or the character string but also the color of the character or the character string. The layout determination unit 114 may select the base reference color by examining the background color from the peripheral pixels on the placement position of the target image or the representative color from the entire target image, and may make the character or the character string remarkable as a complementary color (opposite color) of the reference color. Further, the layout determination unit 114 may make the color of the character or the character string similar to the reference color and blend the color into the image, or may only adjust the transparency by setting the color of the character or the character string as white.

The layout determination unit 114 may determine the font of the character or the character string. As the font, in a case of a Chinese character, a Mincho font or a textbook font is preferable. Further, the layout determination unit 114 may add a shadow to highlight the character or the character string.

The layout determination unit 114 may determine a character or a character string, or a modification of a character constituting the character string. The modification includes at least one of size, thickness, tilt, and aspect ratio. Further, the layout determination unit 114 may determine the number of characters.

The layout determination unit 114 may determine the color, font, modification, and number in accordance with the object recognized by the recognition unit 104. Further, the layout determination unit 114 may determine the color, font, modification, and number in accordance with meaning of the character or the character string. In such a case, the table storage unit 116 may store a table in which the color, font, modification, and number corresponding to the meaning of each character or character string are associated with the character or the character string. In addition, the colors, fonts, modifications, and numbers may be configured to be user-selectable before imaging.

In step S5, the assist information generation unit 124 generates imaging assist information for assisting in setting composition during imaging performed by the camera 22. Here, the assist information generation unit 124 generates one Chinese character "Kami" selected in step S2 as imaging assist information.

In step S6, the synthesis unit 118 synthesizes the character or the character string selected in step S2 with the target image selected in step S3 based on the layout determined in step S4, thereby generating a synthesized image. FIG. 10 is a diagram showing an example of the synthesized image GS1 generated by the synthesis unit 118. As shown in FIG. 10, in the synthesized image GS1, the imaging assist information C1 which is one Chinese character "Kami" is placed on the central portion of the torii gate of the subject. This one Chinese character "Kami" is processed into a character with a blurred border.

Figure 11:
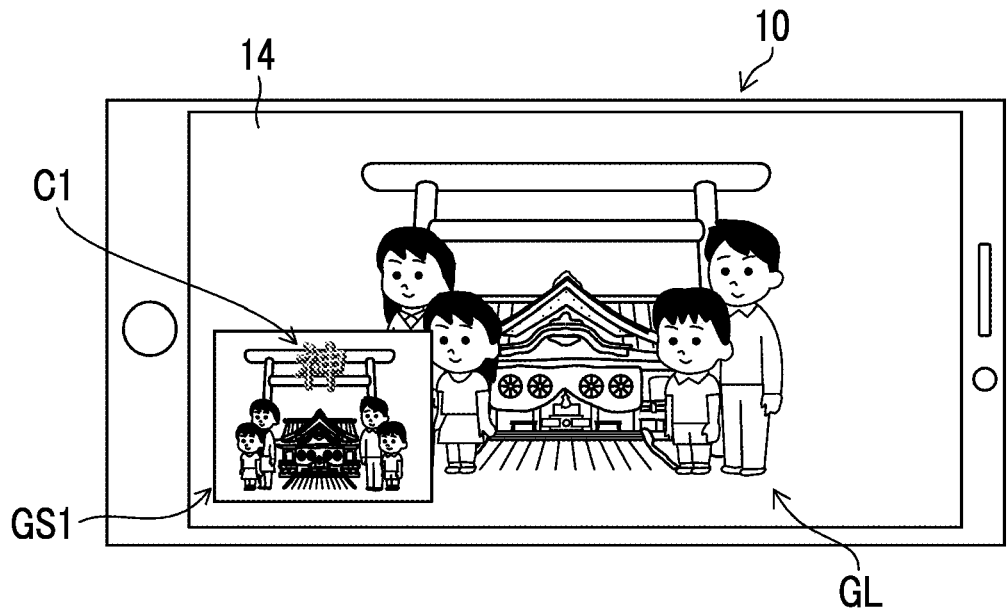
FIG. 11 is a diagram showing an example of a smartphone 10 in which the synthesized image GS1 is displayed on the touch panel display 14.

In step S7 (an example of the display control process), the display control unit 120 causes the touch panel display 14 to display the synthesized image. Here, the display control unit 120 sequentially displays each image of the image group acquired in step S1 as a live view image GL on the entire surface of the touch panel display 14, and displays the synthesized image GS1 on the lower left portion of the live view image GL in the picture-in-picture mode. FIG. 11 is a diagram showing an example of a smartphone 10 in which the synthesized image GS1 is displayed on the touch panel display 14.

The smartphone 10 causes a user to visually recognize the synthesized image GS1 including the imaging assist information C1 to propose a layout of the character or the character string that match the object of the image during imaging, and causes the user to confirm a finish in a case where the characters or the character strings are synthesized before imaging. As a result, it is possible to further assist the user in imaging. The user is able to adjust the composition of the live view image GL while visually recognizing the synthesized image GS1.

After that, in a case where a still imaging instruction is input by the user, the processing proceeds to step S8.

In step S8, the image acquisition unit 102 acquires a still image by the camera 22. The image selection unit 112 selects the acquired still image as the target image. Further, the synthesis unit 118 synthesizes the character or the character string selected in step S2 with the target image based on the layout determined in step S4, thereby generating a synthesized image. Further, the storage control unit 122 stores the synthesized image in the storage unit 34. The storage control unit 122 may cause the storage unit 34 to store, instead of the synthesized image or together with the synthesized image, the target image acquired in step S8, the layout information determined in step S4, and the character or the character string selected in step S2, in association with each other.

The display control unit 120 may display the synthesized image on the touch panel display 14.

Here, in the description of the example, the synthesized image in which imaging assist information is synthesized is displayed together with a live view image by picture-in-picture. However, the live view image may be a synthesized image.

Figure 12:
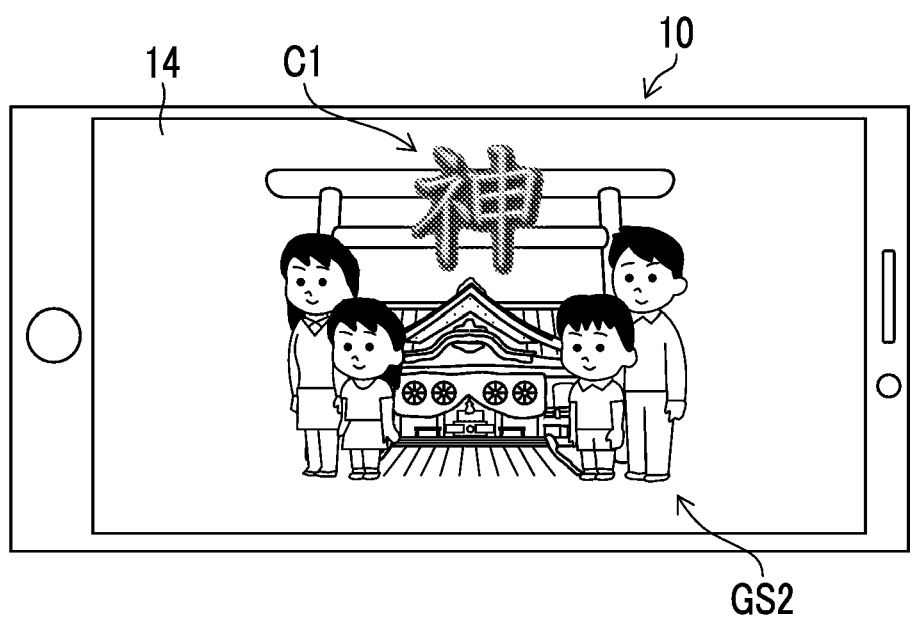
FIG. 12 is a diagram showing an example of a smartphone 10 in which a synthesized image GS2 is displayed on a touch panel display 14.

In such a case, the image acquisition unit 102 acquires an image group consisting of all the images constituting the video for the live view image. The image selection unit 112 selects each image of the image group acquired by the image acquisition unit 102 as the target image. The synthesis unit 118 synthesizes a character or a character string with each image of the image group which is the target image, thereby generating a plurality of synthesized images. The display control unit 120 sequentially displays each image of the image group, which is a plurality of synthesized images, as a live view image on the touch panel display 14. FIG. 12 is a diagram showing an example of a smartphone 10. In the example, the synthesized image GS2 in which the imaging assist information C1 is synthesized is displayed as a live view image on the touch panel display 14. The user is able to adjust the composition of the live view image GL, which is the synthesized image GS2.

Figure 13:
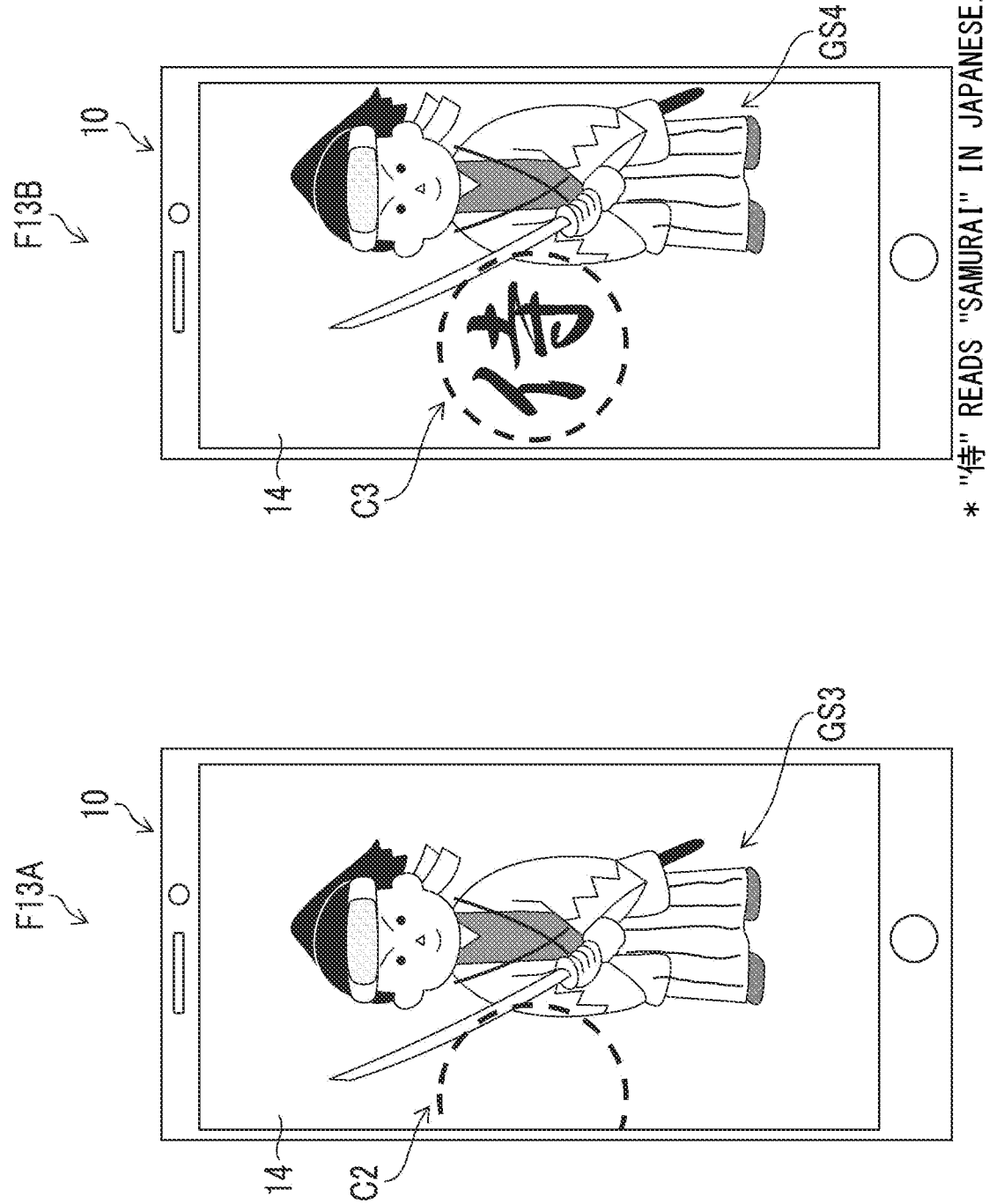
FIG. 13 is a diagram showing an example of a synthesized image GS3 and a synthesized image GS4.

The imaging assist information may include a region display indicating a placement position of the character or the character string. FIG. 13 is a diagram showing an example of a synthesized image GS3 and a synthesized image GS4 which are live view images.

In the example shown in FIG. 13, a man in a samurai figure is the subject. On the other hand, the recognition unit 104 determines that the recognition label "samurai" is the most suitable as an object. The character selection unit 108 selects "Samurai", which is one Chinese character. Further, the layout determination unit 114 determines a layout in which the Chinese character for "Samurai" is placed on the left side of the sword in accordance with meaning of "Samurai".

In F13A shown in FIG. 13, imaging assist information C2 is synthesized with the synthesized image GS3. The imaging assist information C2 is a broken line circle, and the inside of the broken line circle indicates a region indicating the placement position of the "Samurai". In F13A, the left side of the broken line circle is missing. Therefore, the user knows that the optical axis of the camera 22 needs to be further turned to the left in order to place the "Samurai" in the image.

In F13B shown in FIG. 13, imaging assist information C3 is synthesized with the synthesized image GS4. The imaging assist information C3 is a broken line circle and the characters of "Samurai". Since the target image of the synthesized image GS4 includes the entire region of the placement position of the "Samurai" in the image, the assist information generation unit 124 makes the image include not only the broken line circle but also the character "Samurai" inside the broken line circle as the imaging assist information C3. By inputting a still imaging instruction at the position of this composition, the user is able to acquire a synthesized image in which the Chinese character of "Samurai" is synthesized with the image of a man in a samurai figure. It should be noted that the broken line circle indicating the placement position of the "Samurai" is not synthesized in the synthesized image.

In such a manner, the image includes the region display indicating the placement position of the character or the character string in the imaging assist information. Thereby, the smartphone 10 is able to assist in setting the composition during imaging performed by the camera 22.

<Digital Camera>

The imaging apparatus on which the image processing device according to the present embodiment is mounted may be a digital camera. A digital camera is an imaging apparatus that receives light that has passed through a lens by an imaging element, converts the light into a digital signal, and stores the signal in a storage medium as image data of a video or a still image.

Figure 14:
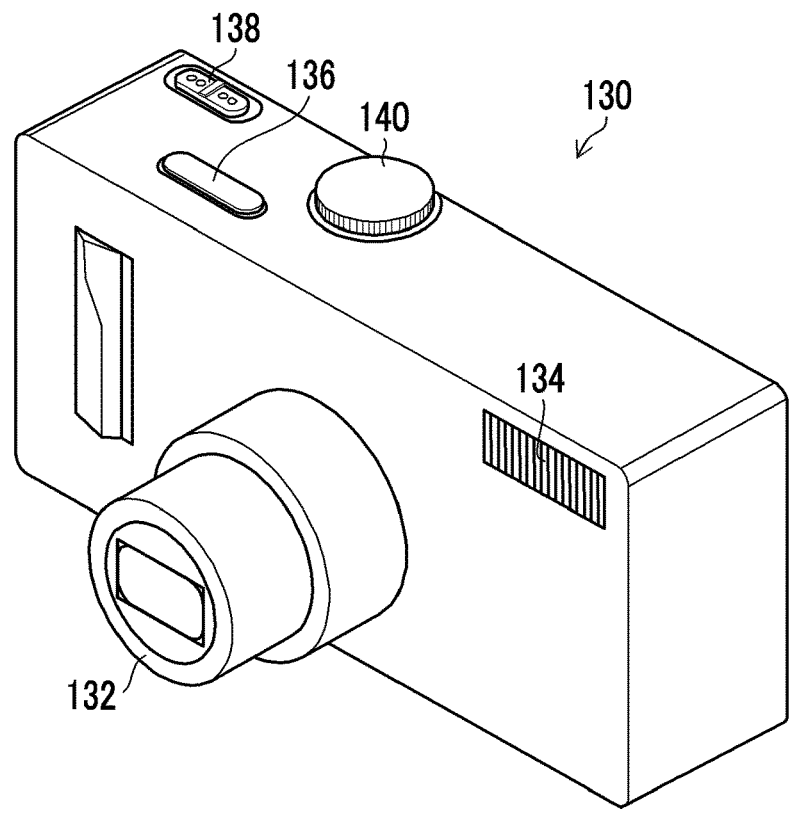
FIG. 14 is a front perspective view of the digital camera 130.
Figure 15:
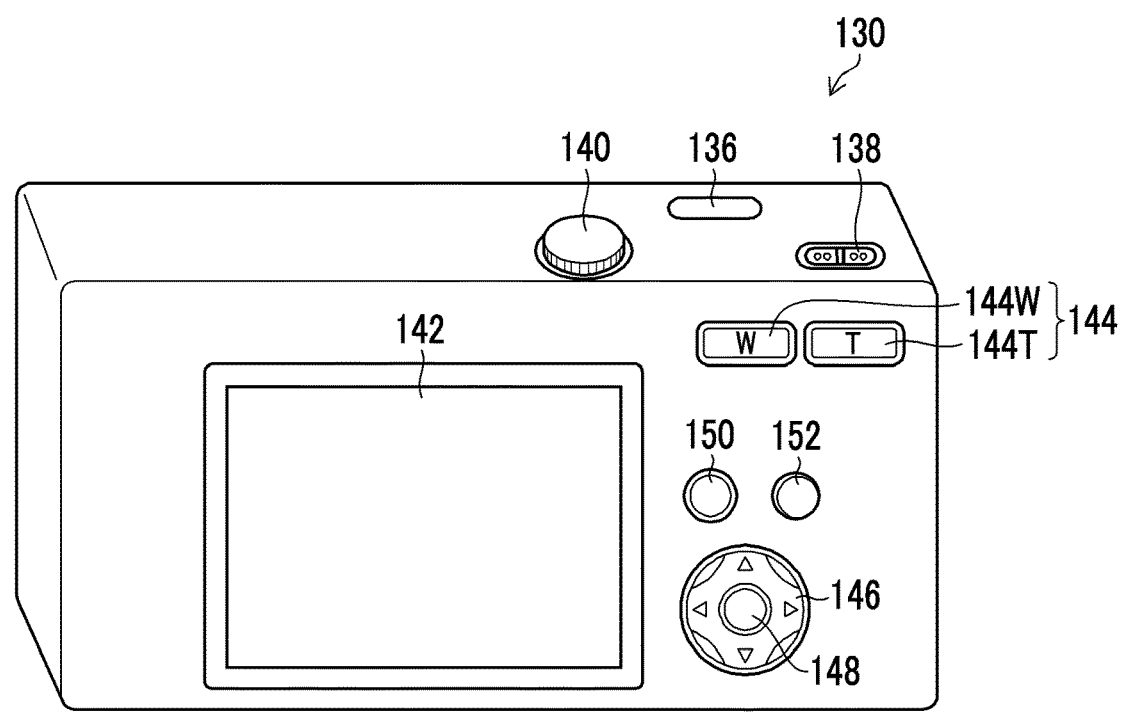
FIG. 15 is a rear perspective view of the digital camera 130.

FIG. 14 is a front perspective view of the digital camera 130. Further, FIG. 15 is a rear perspective view of the digital camera 130. As shown in FIG. 14, the digital camera 130 has an imaging lens 132 and a strobe 134 placed on the front surface thereof, and a shutter button 136, a power/mode switch 138, and a mode dial 140 placed on the upper surface thereof. Further, as shown in FIG. 15, the digital camera 130 has a monitor (LCD) 142, a zoom button 144, a cross button 146, a MENU/OK button 148, a reproduction button 150, and a BACK button 152 placed on the rear surface.

The imaging lens 132 is composed of a retractable zoom lens. The imaging lens 132 is extended from the camera body in a case where the operation mode of the camera is set to the imaging mode by the power/mode switch 138. The strobe 134 is an illumination unit that irradiates a main subject with flash light.

The shutter button 136 is composed of a two-step stroke type switch composed of so-called "half-press" and "full-press". The shutter button 136 functions as an imaging preparation instruction unit and an image capturing instruction unit.

in a case where the still imaging mode or the video imaging mode is selected as the imaging mode, the digital camera 130 enters the imaging standby state. In the imaging standby state, a video is captured, and the captured video is displayed on the monitor 142 as a live view image.

The user is able to visually recognize the live view image displayed on the monitor 142, determine the composition, confirm the subject to be imaged, and set the imaging conditions.

in a case where the shutter button 136 is "half pressed" in the imaging standby state of the still imaging mode, the digital camera 130 performs an imaging preparation operation for performing AF and AE control. Further, the digital camera 130 captures and stores a still image in a case where the shutter button 136 is "fully pressed".

On the other hand, the digital camera 130 starts the main imaging (recording) of the video in a case where the shutter button 136 is "fully pressed" in the imaging standby state of the video imaging mode. Further, in a case where the shutter button 136 is "fully pressed" again, the digital camera 130 stops recording and goes into a standby state.

The power/mode switch 138 is slidably provided between the "OFF position", the "reproduction position", and the "imaging position". The digital camera 130 turns off the power in a case where the power/mode switch 138 is operated to the "OFF position". Further, the digital camera 130 is set to the "reproduction mode" in a case where the power/mode switch 138 is operated to the "reproduction position". Further, the digital camera 130 is set to the "imaging mode" in a case where the power/mode switch 138 is operated to the "imaging position".

The mode dial 140 is a mode switching unit that sets the imaging mode of the digital camera 130. The digital camera 130 is set to various imaging modes in accordance with the setting positions of the mode dial 140. For example, the digital camera 130 can be set to a "still imaging mode" for capturing a still image and a "video imaging mode" for capturing a video by using the mode dial 140.

The monitor 142 is a display unit that displays a live view image in the imaging mode and a video and a still image in the reproduction mode. Further, the monitor 142 functions as a part of the graphical user interface by displaying a menu screen or the like.

The zoom button 144 is a zoom indicator. The zoom button 144 comprises a telephoto button 144T for issuing an instruction of zooming to the telephoto side and a wide button 144W for issuing an instruction of zooming to the wide angle side. The digital camera 130 changes the focal length of the imaging lens 132 to the telephoto side and the wide angle side by operating the telephoto button 144T and the wide button 144W in the imaging mode. Further, the digital camera 130 enlarges and reduces the image being reproduced by operating the telephoto button 144T and the wide button 144W in the reproduction mode.

The cross button 146 is an operation unit for the user to input instructions in four directions of up, down, left, and right. The cross button 146 functions as a cursor movement operation unit for the user to select an item from the menu screen or to give an instruction to select various setting items from each menu. Further, the left button and the right button of the cross button 146 function as a frame advance operation unit in which the user performs frame advance in the forward direction and the reverse direction, respectively, in the reproduction mode.

The MENU/OK button 148 is an operation unit that has both a function as a menu button for issuing a command to display a menu on the screen of the monitor 142 and a function as an OK button for issuing a command to confirm and execute the selected content.

The reproduction button 150 is an operation unit for switching to a reproduction mode in which the stored video or still image is displayed on the monitor 142.

The BACK button 152 is an operation unit that issues an instruction to cancel the input operation or return to the previous operation state.

In the digital camera 130, the button/switch function may be implemented by providing a touch panel and operating the touch panel instead of providing members unique to the buttons and the switches.

In the digital camera 130 configured in such a manner, the block diagram showing the internal configuration is the same as FIG. 4 in which the imaging lens 132 is used instead of the imaging lens 50. The digital camera 130 can be equipped with the image processing device shown in FIG. 5. Further, the digital camera 130 can execute an image processing program and perform the image processing method shown in FIG. 6.

<Others>

The image processing device according to the present embodiment is not limited to the mode mounted on the imaging apparatus, and may have the functional configuration shown in FIG. 5. For example, the image processing device may be mounted on a personal computer terminal that does not have an imaging function.

An image processing program that causes a computer to execute an image processing method may be provided by storing the program in a non-transitory computer-readable storage medium. Further, the image processing program may be provided as an application that can be downloaded from an external server through the wireless communication unit 30 or the external input output unit 40. In such a case, the smartphone 10 stores the downloaded image processing program in the storage unit 34. The contents of the candidate storage unit 110 and the table storage unit 116 may be included in the image processing program.

Further, the candidate storage unit 110 and the table storage unit 116 may be provided in an external server. A part of the processing of the image processing program may be performed by the smartphone 10 or the digital camera 130, and other processing may be performed by an external server.

The technical scope of the present invention is not limited to the scope described in the above embodiments. The configurations and the like in each embodiment can be appropriately synthesized between the respective embodiments without departing from the spirit of the present invention.

EXPLANATION OF REFERENCES

10: smartphone
12: housing
14: touch panel display
16: speaker
18: microphone
20: camera 22: camera
26: switch
30: wireless communication unit
32: calling unit
34: storage unit
36: internal storage unit
38: external storage unit
40: external input output unit
42: GPS reception unit
44: power supply unit
50: imaging lens
50F: focus lens
50Z: zoom lens
54: imaging element
58: A/D converter
60: lens drive unit
100: image processing device
102: image acquisition unit
104: recognition unit
106: score calculation unit
108: character selection unit
110: candidate storage unit
112: image selection unit
114: layout determination unit
116: table storage unit
118: synthesis unit
120: display control unit
122: storage control unit
124: assist information generation unit
130: digital camera
132: imaging lens
134: strobe
136: shutter button
138: mode switch
140: mode dial
142: monitor
144: zoom button
144T: telephoto button
144W: wide button
148: MENU/OK button
150: reproduction button
152: BACK button
A: angle of view
C1: imaging assist information
C2: imaging assist information
C3: imaging assist information
GL: live view image
GS1: synthesized image
GS2: synthesized image
GS3: synthesized image
GS4: synthesized image
S: subject
S1 to S8: steps of image processing method

What is claimed is:

1. An image processing device comprising a processor configured to:
acquire a time-series image group captured by an imager;
select a character or a character string from at least one image in the image group;
select a target image, on which the selected character or character string is placed, from the image group;
determine a layout of the selected character or character string in the target image in accordance with meaning of the selected character or character string;
generate imaging assist information for assisting in setting composition during imaging performed by the imager;
synthesize an image by combining the imaging assist information with the target image based on the determined layout; and
display the synthesized image on a display,
wherein the image processing device further comprises a storage configured to store a table in which a position of each character or each character string to be placed in an image is specified.

2. The image processing device according to claim 1, wherein the imaging assist information includes a region display indicating a placement position of the selected character or character string rather than displaying the selected character or character string.

3. The image processing device according to claim 2, wherein the imaging assist information includes only the region display indicating the placement position of the selected character or character string prior to display of the selected character or character string without displaying the selected character or character string.

4. The image processing device according to claim 1, wherein the processor is further configured to:
select the image group as the target image; and
sequentially display each image of the image group in which the imaging assist information is combined as a live view image.

5. The image processing device according to claim 1, wherein the processor is further configured to:
select one image in the image group as a target image; and
sequentially display each image of the image group as a live view image, and further display the target image in which the imaging assist information is combined.

6. The image processing device according to claim 1, wherein the processor is further configured to:
recognize an object included in at least one image in the image group; and
select the character or character string in accordance with the recognized object.

7. The image processing device according to claim 6, wherein the processor is further configured to:
calculate a score for each object included in at least one image in the image group; and
recognize the object from the score.

8. The image processing device according to claim 6, further comprising:
a storage configured to store a plurality of candidates for characters or character strings for each object,
wherein the processor is configured to select the character or character string from the plurality of candidates corresponding to the recognized object.

9. The image processing device according to claim 1, wherein the processor is configured to select one Chinese character.

10. The image processing device according to claim 1, wherein the time-series image group is an image group captured within a constant time.

11. An imaging apparatus comprising:
the image processing device according to claim 1;
an imager configured to capture a time-series image group; and
a display configured to display images.

12. The image processing device according to claim 1, wherein the imaging assist information includes the selected character or character string.

13. An image processing method comprising:
acquiring a time-series image group captured by an imager;

selecting a character or a character string from at least one image in the image group;

selecting a target image, on which the selected character or character string is placed, from the image group;

determining a layout of the selected character or character string in the target image in accordance with meaning of the selected character or character string;

generating imaging assist information for assisting in setting composition during imaging performed by the imager;

synthesizing an image by combining the imaging assist information with the target image based on the determined layout; and displaying the synthesized image on a display, wherein the image processing method further comprises storing, in a storage, a table in which a position of each character or each character string to be placed in an image is specified.

14. A non-transitory computer-readable storage medium on which computer instructions for causing a computer to execute the image processing method according to claim 13 is stored.

15. The image processing method according to claim 13, wherein the imaging assist information includes only a region display indicating a placement position of the selected character or character string prior to display of the selected character or character string without displaying the selected character or character string.

16. An image processing device comprising a processor configured to:

acquire a time-series image group captured by an imager;

calculate a score for each object included in at least one image in the image group;

recognize an object included in the at least one image in the image group from the score;

select a character or a character string in accordance with the recognized object;

select a target image, on which the selected character or character string is placed, from the image group;

determine a layout of the selected character or character string in the target image in accordance with meaning of the selected character or character string;

generate imaging assist information for assisting in setting composition during imaging performed by the imager;

synthesize an image by combining the imaging assist information with the target image based on the determined layout; and display the synthesized image on a display.

17. An image processing device comprising a processor configured to:

acquire a time-series image group captured by an imager;

recognize an object included in at least one image in the image group;

select a character or a character string in accordance with the recognized object;

select a target image, on which the selected character or character string is placed, from the image group;

determine a layout of the selected character or character string in the target image in accordance with meaning of the selected character or character string;

generate imaging assist information for assisting in setting composition during imaging performed by the imager;

synthesize an image by combining the imaging assist information with the target image based on the determined layout; and display the synthesized image on a display, wherein:

the image processing device further comprises a storage configured to store a plurality of candidates for characters or character strings for each object; and the processor is configured to select the character or character string from the plurality of candidates corresponding to the recognized object.

* * * * *